June 4, 1929.                E. A. JOHNSON                1,716,062
                         SELF ADJUSTING BEARING
                          Filed July 28, 1926
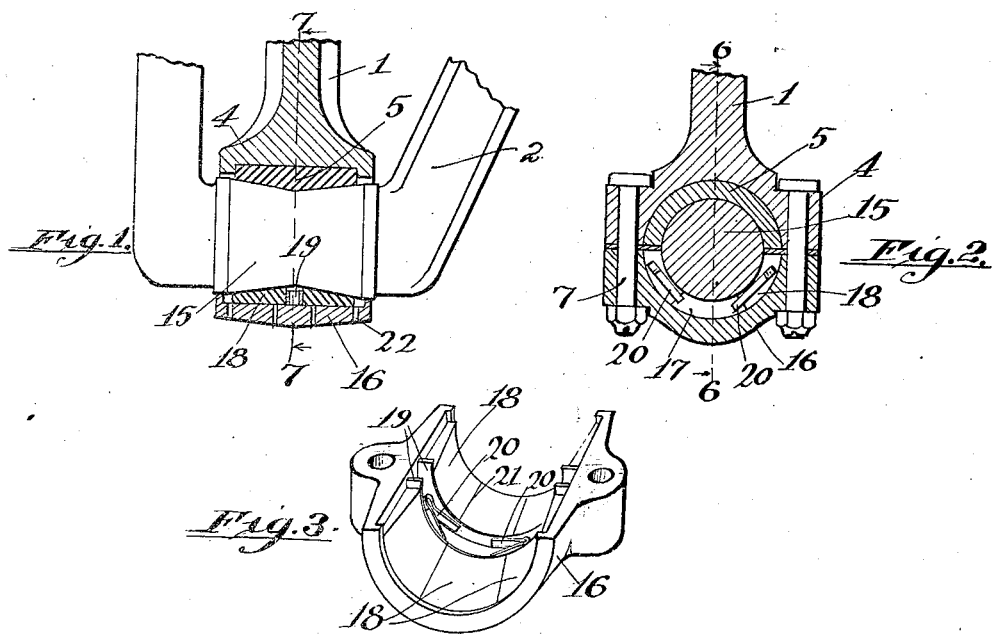
Inventor
E. A. Johnson
by Hazard and Miller
Attorneys Patented June 4, 1929.

UNITED STATES PATENT OFFICE.

1,716,062

ELMER A. JOHNSON, OF LOS ANGELES, CALIFORNIA.

SELF-ADJUSTING BEARING.

Application filed July 28, 1926. Serial No. 125,418.

My invention is a self-adjusting bearing constructed to take up slack which forms in the bearing due to wear, being adapted for a bearing for rotating shafts, cranks, wrist pins, reciprocating shafts or the like.

An object of my invention is a bearing which will be self-adjusting in that it will take up the wear in the bearing due to the rotation of the shafts, cranks, wrist pins, reciprocating shafts or other devices.

A more particular object of my invention is to construct the bearing so that the wear will be automatically taken up without attention by a mechanic or other person making the adjustment.

A further detailed object of my invention is a self-adjusting bearing which may be adapted to machines or the like now in use, as well as new installations or new types of bearings.

In constructing my self-alining bearing I may use bushing or the taking up devices bearing directly on the shaft and forming a wearing surface. The take up device comprises one or more wedges fitted in a bearing in a suitable manner and having springs which under normal action tend to tighten up the bearing by forcing the wedges closer into engagement with a bushing or into direct engagement with a shaft or other rotating or reciprocating body. In bearings for crank shafts or the like I may have the wedges press on a bushing and by the spring action always maintain the bushing in close engagement with the shaft.

In other types of connecting rod bearings I may have the wedges formed of a suitable bearing material and constructed to wedge against the crank or other rotating body and thereby take up the wear. Somewhat similar constructions may be utilized for continuous or line shafts or the like, either having split bushings which are pressed against the shaft by wedges under spring action or by having the split wedges forced between the shaft and a bearing block by the spring action.

My invention in its various phases will be more readily understood from the following description and drawings, in which;

Fig. 1 shows a construction with the wedges acting directly on the rotating shaft, taken on the line 6—6 of Fig. 2;

Fig. 2 is a transverse section on the line 7—7 of Fig. 1;

Fig. 3 is a perspective view of the lower bearing block, illustrating the wedges mounted therein.

A connecting rod is indicated by the numeral 1 and a crank by the numeral 2. The end of the connecting rod is provided with the upper bearing block 4 which is of standard construction having an upper bushing 5 mounted therein. The lower bearing block is connected to the upper block by bolts 7 or the like.

In the construction illustrated, the crank section 15 is illustrated as being tapered inwardly towards the center to eliminate side bearings for the crank and maintain the connecting rod in proper position lengthwise of the section 15.

The lower bearing block 16 has preferably a base surface 17 concentric with the axis of the crank and has split bushings 18 in the form of wedges fitted therein. Rings 19 are positioned adjacent the wide end of the bushings which are formed tapered as wedges and springs 20 bear against the rings, thus normally tending to thrust the wedge bearings outwardly. These bushings are shown with longitudinal slits 21, however, if desired they can be made in substantially semi-circular pieces without such slits.

These bearings may be assembled by thrusting the wedge shaped bushings inwardly and holding them by pins inserted in the apertures 22, then removing such pins. In this type of bearing as the wearing bushings become worn the springs thrust them outwardly and thus tighten the bearing.

Having described my invention, what I claim is:

1. A self adjusting bearing comprising in combination a shaft having portions tapered longitudinally inwardly towards the center, a bearing block surrounding said shaft, a bushing split transversely in said bearing block engaging the shaft, and spring means to thrust the parts of said bushing apart into close engagement with the shaft longitudinally and transversely thereof, the bushing being formed wedge shaped and having a plurality of longitudinal slits.

2. A self adjusting bearing comprising in combination a shaft having two integral portions tapered longitudinally inwardly towards the center whereby the center of the bearing portion of the shaft is of a lesser diameter than the bearing portion at the two ends of the shaft, a bearing block surrounding said shaft, a bushing split transversely in said bearing block engaging the shaft, and spring means to thrust the parts of said bushing apart into close engagement with the shaft longitudinally and transversely thereof.

3. A self adjusting bearing comprising in combination a shaft having two portions tapered longitudinally inwardly towards the center, whereby the center of the bearing portion is of a lesser diameter than the ends of the bearing portion, a bearing block surrounding the shaft, a bushing split transversely into two parts in said bearing block engaging the shaft, each part of the bushing formed by the transverse split having longitudinal slits, and a spring means to thrust the said parts of the bushing apart into close engagement with the shaft longitudinally and transversely thereof.

4. A self adjusting bearing comprising in combination a shaft having two portions tapered longitudinally inwardly towards the center, whereby the center bearing portion of the shaft is of a lesser diameter than the end bearing portions, a bearing block surrounding said shaft, a bushing split transversely into two parts in said bearing block and engaging the said shaft, each of said parts being wedge shaped with the thick portion of the wedge in the center of the bearing and having a plurality of longitudinal slits, and spring means to thrust the parts of the bushing apart longitudinally of the shaft into close engagement therewith in a longitudinal and transverse direction of the shaft.

5. A self adjusting bearing comprising in combination a shaft having a pair of portions tapered longitudinally inwardly towards the center, whereby the center of the shaft at the bearing is of lesser diameter than the ends of the shaft at the bearing, an upper bearing block and a lower bearing block surrounding the shaft, a fixed bushing in the upper block, a bushing in the lower block split transversely into two parts, each of said parts being formed wedge shaped and having longitudinal slits, a pair of partial rings engaging the thick inner ends of the parts of the bearing, and springs bearing against said partial rings, said springs pressing the parts of the transversely split bushing longitudinally of the shaft.

In testimony whereof I have signed my name to this specification.

ELMER A. JOHNSON.